Figures 1, 2:
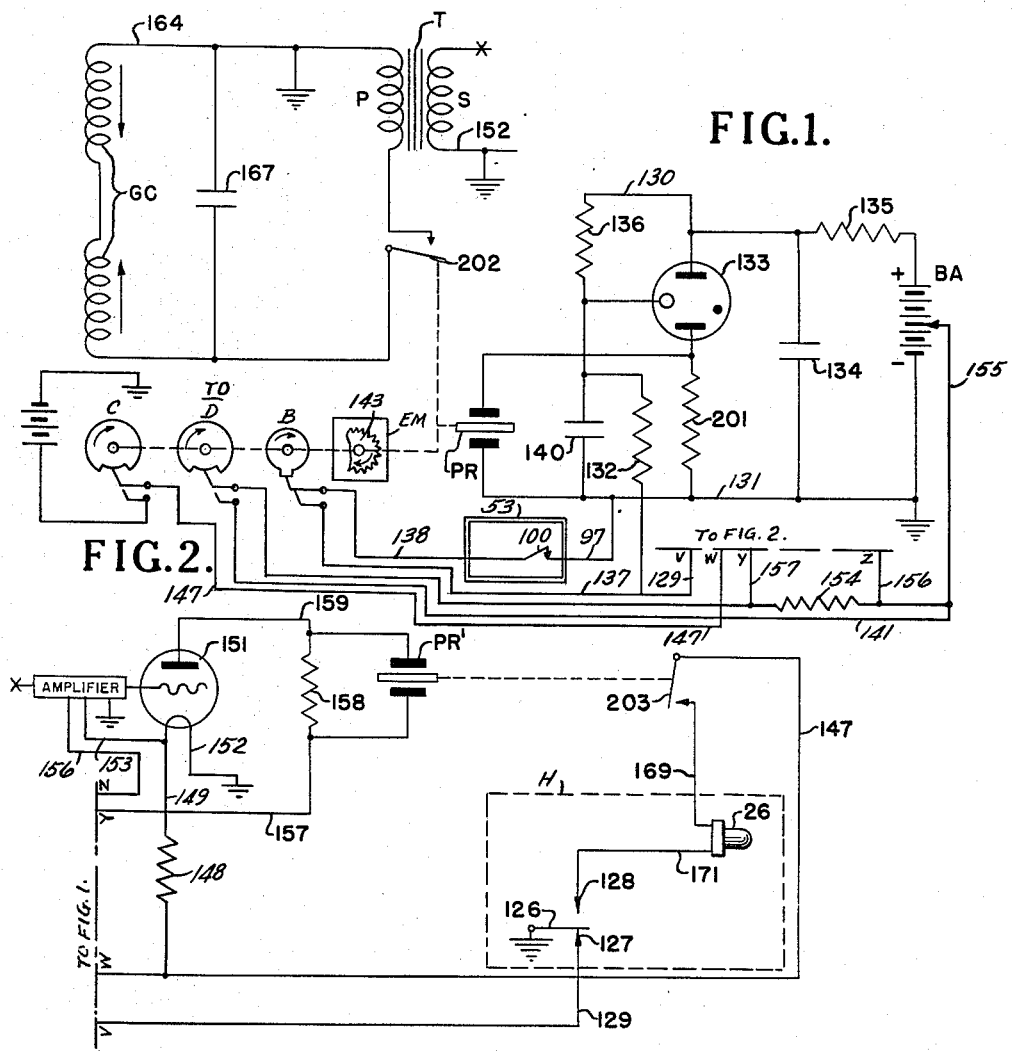

INVENTORS.
E. S. GILFILLAN
E. ROOT III
ATTYS

United States Patent Office 2,958,280
Patented Nov. 1, 1960

2,958,280

MAGNETIC MINE FIRING CIRCUIT

Edward S. Gilfillan, Lincoln Ave., Manchester, Mass., and Elihu Root III, 14 Curtis St., Springfield, Vt.

Filed Apr. 6, 1951, Ser. No. 219,742

8 Claims. (Cl. 102—18)

(Granted under Title 35, U.S. Code (1952), sec. 266)

This invention relates generally to improvements in magnetically responsive mine firing circuits and the like and more particularly to new and improved firing circuits wherein piezoelectric crystal relays are employed in lieu of electroresponsive contacting devices whereby the attendant large magnetic field disturbance and current drain which are inevitable upon actuation of an electromagnetic type relay is obviated in the circuit arrangement of the present invention. Piezoelectric relays per se are well known in the art as evidenced by the U.S. Patent to W. P. Mason, No. 2,166,763, for example.

Our copending application, Serial No. 411,318 filed September 18, 1941, now Patent No. 2,892,403, the present joint inventors being included with the joint inventors of the aforesaid copending application, discloses a magnetic gradiometer detecting circuit employed in a depth charge in which the electrical variations resulting from the detected gradient field are made suitable for A.C. amplification by means of a contactor circuit in which currents proportional to the magnitude of the relatively slowly varying gradient signals are passed through the primary coil of a transformer periodically by an electromagnetic contactor device or relay. This intermittent contacting provides signals of high enough frequency to be transmitted by the transformer and associated amplifier circuits and of magnitude proportional to the gradient detected signals. These signals upon amplification are the applied to a trigger device for passing a current therethrough to an electromagnetic firing relay when the signal magnitude reaches a predetermined value. The relay closes a circuit which fires a detonator to explode the explosive charge. Both the aforementioned electromagnetic contactor and relay employed in the circuit of the copending application produce large magnetic fields upon operation and thereby tend to disturb the gradient field which the device is to detect. Both such electromagnetic devices also require large currents with the resulting excessive battery drain to produce the magnetic attraction required to attract the armatures thereof.

The present invention, which is an improved modification of the circuit disclosed in the aforementioned copending application, overcomes the aforementioned difficulties associated with electromagnetic relays by providing, in a depth charge circuit, piezoelectric relays both for the contactor relay function and for the firing relay function. The magnetic fields associated with the operation of these relays is negligible due to the absence of any high permeability magnetic material and the greatly reduced current required for their actuation, piezoelectric relays being essentially potential responsive devices. These relays, by operating primarily from a potential instead of due to the flow of a current, also act to greatly conserve the battery drain required and may therefore be incorporated in the type of circuit disclosed adapted for use as an underwater mine wherein power is supplied solely from batteries contained therein and wherein the batteries may be required to maintain a predetermined voltage sufficient to provide a sensitive period of operation of several months.

It is an object of this invention to provide a new and improved magnetic mine or depth charge firing circuit.

Another object of this invention is to provide a new and improved magnetically responsive electro-actuation circuit in which devices of high permeability magnetic materials and their associated large electromagnetic fields have been eliminated.

Another object of this invention is to provide an improved electro-actuable circuit in which electrical contacts are actuated without requiring the current flow attendant upon operation of electromagnetically operated relay contactors.

A further object resides in the provision of a magnetic induction type mine firing circuit in which electrical contacting and relay functions are accomplished by non-magnetic, essentially potential responsive devices whereby spurious magnetic fields and battery drain in the circuit due to operation of such device is substantially obviated.

A still further object resides in the provision of an induction type circuit for detecting weak, slowly varying magnetic fields wherein an electrical contacting function is accomplished by a non-magnetic, essentially potential responsive device operable from a source of essentially potential oscillations whereby the undesired effects of battery drain and spurious magnetic field generation are reduced to a negligible quantity.

Other objects and many of the attendant advantages of this invention will be readily appreciated as the same becomes better understood by reference to the following detailed description when considered in connection with the accompanying drawings wherein:

Fig. 1 is a schematic view of a gradiometer circuit in which electrical contacts are actuated by a piezoelectric relay energized by a relaxation oscillator; and Fig. 2 is a schematic view of an amplifier and firing control circuit arrangement which is controlled by the circuit of Fig. 1 and includes a piezoelectric relay in lieu of the magnetic relay of the copending application.

Referring now to the drawings in which like numerals of reference are used to designate like parts throughout the various views, and more particularly to Fig. 1 thereof, there is shown thereon a piezoelectric relay PR connected in the contactor circuit of the gradiometer detector system. Gradiometer coils GC are disposed in spaced relation for detecting the gradient magnetic field and are connected in series with a primary winding of the signal transformer T and a pair of contacts 202 which are periodically closed by the motion of piezoelectric relay PR. By periodically completing this circuit the gradient signal is passed through the transformer T and appears at the secondary windings from which it is applied at connection X to the input of the amplifier and firing circuit of Fig. 2, the firing circuit being schematically illustrated in Fig. 2. The amplifier circuit of Fig. 2 may, if desired, be the circuit disclosed in the aforesaid copending application or it may be any conventional type known to those skilled in the art. Piezoelectric relay PR is energized periodically by the relaxation oscillator comprising gas tube 133 and its associated circuit which operates for this purpose without a heavy discharge current upon conduction of tube 133 due to the essentially potential response of relay PR, a relatively large current otherwise being required to operate an electromagnetic relay for this purpose. The voltage output of the oscillator is accomplished by inserting a resistor 201 of high resistance in the main discharge path through which the current from condenser 134 flows thereby producing a large voltage across resistor 201. Piezoelectric relay PR is connected directly across resistor 201 and the voltage thereacross due to the current flow during conduction of tube 133 is effective to deflect the piezoelectric actuated contacts 202. This deflection of relay PR is also utilized to drive a cam assembly TD, similar to the one disclosed in the aforesaid copending application, this being accomplished, if desired, by operating an escapement mechanism EM under control of relay PR, for example, as will be apparent to those skilled in the art.

It is thus apparent that the actuation circuit can be operated without large current flows due to the limiting effect of resistor 201 and the negligible current drawn by the parallel path through the relay PR, and the closure of the contacts 202 is accomplished without setting up any appreciable magnetic field since the current flow is small and no high permeability magnetic material is associated with the achievement of the mechanical motion.

Referring now to Fig. 2, which is electrically connected to the circuit of Fig. 1 at connections V, W, X, Y and Z, there is shown the firing circuit in schematic form and the amplifier in box diagram, the firing circuit being operated in response to the amplifier which, in turn, is operated from transformer T at point X, this circuit including a piezoelectric relay PR' which is energized by the voltage drop across resistor 158 due to conduction in tube 151. When tube 151 has received signals of sufficient amplitude to become conductive and has increased the voltage drop across resistor 158 to a predetermined value, piezoelectric relay PR' closes the contacts 203 to actuate the detonator if the correct sequence of operations, as subsequently explained herein, has occurred.

The operation of the system will now be more specifically described with reference to both Figs. 1 and 2 of the drawings. Let it be assumed, by way of example, that a soluble washer has been placed in operative position within the mine, as is conventional practice, and that the cam timing assembly, indicated generally as TD, has the cam elements B, C and D thereof at rest in their home positions and, furthermore, that the mine has been launched within a body of water of sufficient depth to cause the extender hydrostat H to operate when the soluble washer has dissolved or softened sufficiently to permit movement of the hydrostat in response to the pressure of the water. A hydrostat switch element 126 (Fig. 2) is normally maintained in engagement with contact 127 and disengaged from contact 128 thereby maintaining a ground potential on conductor 129 which is connected to the grid of gas tube 133 (Fig. 1) through resistor 132. The grounding of conductor 129, which effectively biases the grid of tube 133, positively prevents the operation of the relaxation circuit and timing device until the hydrostat is moved to the operated or armed position. With the hydrostat unoperated, ground is removed from one end of the detonator 26 thereby preventing the operation of the detonator and premature firing of the mine during handling, transportation, and planting of the same. When the mine has been planted for a period of time sufficient to cause the hydrostat H to operate, the contact element 126 thereof is disengaged from contact 127 and moved into engagement with contact 128. The mine is now in a partially armed condition. At the same time, the grid of tube 133 remains connected to ground through resistor 132, lead 137, the closed contacts of cam B, conductor 138, switch element 100, and conductors 97 and 131, and thus the relaxation oscillator is maintained in an inoperative state until activation of acoustic detector 53 functions to disengage switch element 100 from conductor 97.

Now, let it be assumed that a vessel moves into the threshold of sensitivity of the acoustic device 53 such that vibrations from the ship's propulsion system are received through the water by the acoustic detector 53 thereby causing the detector to operate sufficiently to disengage conductor 97 from contact 100 thereof. When this occurs, ground at conductor 131 is removed from one end of the resistance element 132 thereby causing the relaxation circuit comprising the gaseous discharge device 133 to operate in the following manner.

Condenser 134, it will be noted, is charged at this time substantially to the potential of the battery BA, the condenser charging circuit including a high resistance 135, and the plate of the tube 133 has a potential applied thereto substantially equal to the potential of the battery. The resistance 135 is connected to resistance 136 by the conductor 130, resistance 136 being connected to resistance 132, the point of connection between the resistances 136 and 132 also being connected to condenser 140 and the grid of tube 133. The resistance units 136 and 132 are thus arranged to comprise a potentiometer having one end thereof connected to the positive terminal of the battery BA by way of resistance 135 and the other end connected by way of conductor 137, the contacts of cam B, conductor 138, contacts 100 and 97 in engagement with each other, conductor 131 and thence to ground whereby the potential of the grid of the tube 133 is maintained below the firing potential of the tube, the condenser 140 being charged to this potential.

As the contacts of the acoustic detector 53 are disengaged, ground is removed from conductor 137 extending to one end of the resistance 132 thereby causing a rising potential to be applied to the grid of the tube and the charge on condenser 140 to be increased. The resistance 136 is relatively high whereby the charging current for the condenser 140 is maintained at a relatively low value and the increase in voltage at the grid of the tube is thus accomplished at a slow rate whereby the grid potential is not increased sufficiently to fire the tube as the acoustic detector contacts are disengaged momentarily from the first time in response to the vibrations received from the vessel.

As the contacts 100 and 97 are engaged momentarily the charge on condenser 140 as reduced by the flow of current through the resistance 132. It will be noted, however, that the detector contacts are open during relatively greater intervals of time when the time during which the contacts are closed whereby more current flows into the condenser 140 than flows out of the condenser. The charge on condenser 140 is thus gradually increased and the potential of the grid of the tube 133 is also increased during successive operation of the detector contacts until sufficient potential is attained to cause the tube to fire. When this occurs a circuit is completed from positive potential on conductor 130, through tube 133, large resistor 201, conductor 131 and thence to ground. Piezoelectric relay PR is connected directly across resistor 201 and the voltage thereacross due to current flow during conduction of tube 133 is effective to deflect the piezoelectric elements. This deflection of relay PR is effective to close the contacts 202 and also to drive ratchet wheel 143 of the escapement mechanism EM. The escapement mechanism EM includes ratchet wheel 143, shown partly in section, and the necessary mechanical components (not shown) to rotate ratchet wheel 143 one notch per each deflection of piezoelectric relay PR. Upon deflection of relay PR, the mechanical component which drives ratchet wheel 143 retracts to engage a succeeding tooth thereof. As tube 133 conducts, the condensers 134 and 140 discharge until the voltage on the plate of the tube is reduced sufficiently to extinguish the tube thereby interrupting the discharge circuit through condensers 134 and 140 and causing cessation of the deflection of piezoelectric relay PR. Upon relaxation of relay PR, the ratchet wheel driver releases to rotate wheel 143 one notch, which in turn rotates cams B, C and D one step.

Closure of contacts 202 in response to deflections of the piezoelectric relay PR closes a circuit from ground at conductor 164, gradient coils GC, primary winding P of the transformer T and thence to ground, the circuit including a condenser 167 in parallel with the gradient coils. The condenser 167 is charged to a potential proportional to the gradient of the magnetic field detected by the coils GC. This potential is applied suddenly to the transformer T by the closure of the contacts 202, but the gradient signal detected at this time is ineffective for the reasons that the filament of the tubes in the amplifier circuit are not in a heated condition.

As the voltage across the condenser 134 falls below the potential required to maintain a discharge within the tube 133, the tube is extinguished and the deflecting stresses on piezoelectric relay PR are relaxed, causing the contacts 202 to be disengaged thereby interrupting the circuit between the condenser 167 and the primary winding P of transformer T. Relaxation of the deflecting stresses on piezoelectric relay PR also causes the ratchet wheel 143 to advance one notch thereby advancing the cam assembly B, C and D one step.

The charge on condenser 134 is now increased by current flowing through resistance 135, and the charge on condenser 140, with the detector contacts in open position, is increased by current flowing through resistance 136 till sufficient potential is applied to the plate and grid of tube 133 to cause the tube to fire. When this occurs the piezoelectric relay PR is again operated thereby connecting the gradiometer coils GC and the condenser 167 to winding P of the transformer by way of contacts 202 and the ratchet wheel driving mechanism is moved into engagement with the next succeeding tooth of the ratchet wheel 143. The relatively low impedance of the discharge circuit causes the gaseous discharge tube 133 to be extinguished thereby interrupting the circuit to the piezoelectric relay and causing opening of contacts 202 and the cam assembly of the timing device to be advanced to a succeeding position.

As the cam assembly is moved into succeeding positions in response to impulses received from the relaxation circuit, the first operation of the cam timing device TD is to open the contacts of cam B thereby disconnecting the acoustic detector contacts from the resistance 132 and insuring that the relaxation circuit will continue to operate cyclically to control the cam assembly of the timing device to be stepped ahead until cam B closes at the completion of the instant revolution of the cam or until the mine is exploded, as the case may be. With the contacts of cam B having been opened, the second operation of cam assembly TD in response to further succeeding impulses from the relaxation circuit is to close the contacts of cam C thereby applying battery by way of cam C contacts, conductor 147, resistance 148, conductor 149, filament of tube 151, and thence by way of conductor 152 to ground. The filament circuit of the amplifier includes the filaments of the tubes therein in series and in parallel with the filament of tube 151 by way of conductor 153 and ground, as shown. The plate operating potential is applied to the amplifier from battery BA and leads 155 and 156.

The tube 151 may be of any type in which the plate discharge current is maintained continually in response to a firing potential applied to the grid of the tube such, for example as a thyratron tube known in the trade as RK-62. The closure of cam C contacts also applies battery by way of conductor 147 to one of the contacts of switch 203. With the contacts of cam B open and the contacts of cam C closed, the third function of the cam assembly TD is to close, in response to further impulses from the relaxation oscillator, the contacts of cam B therby short circuiting resistance 154 and applying battery at 155 by way of conductor 156, cam D contacts, conductor 157, the piezoelectric relay PR' and resistance 158 in parallel, conductor 159 and thence to the plate of the thyratron tube 151. The mine is now in an armed condition. The operation of the first, second and third functions of the cam assembly are accomplished by virtue of the fact that the notch on cam B has a smaller arc than the arc of the recessed portion of cam C which in turn has a smaller arc than the recessed portion of cam D.

Each operation of piezoelectric relay PR causes the contacts 202 to close and connect the gradiometer coils GC and condenser 167 to the winding P of the transformer T. The vessel, it will be recalled is continually approaching the mine during this time whereby the gradient signals stored within the condenser 167 and applied periodically to the transformer are of an ever increasing order of magnitude. These signals are applied to the input of the amplifier by the secondary winding S of transformer T and amplified therein during the approach of the vessel until a signal is transmitted by the tube 15 of sufficient strength to cause the piezoelectric relay PR' to operate. The vessel, it will be understood, has moved ahead during this time to a position such that it is substantially directly above the mine, the distance through which the vessel has moved being selectively variable and determined by the setting of a variable resistance element (not shown) in the grid circuit of one of the tubes of the amplifier.

As is well known to those skilled in the art, a variable resistor may be so arranged in a grid circuit of an amplifier tube whereby the degree of amplification or gain within the amplifier may be varied at will in accordance with the setting of the variable resistor, and therefore, by use of such a resistor arrangement in the amplifier circuit, the mine may be caused to explode under a predetermined portion of the vessel in accordance with the setting of the variable resistor. The operation of piezoelectric relay PR' sets up deflection stresses therein which actuate the closure of contacts 203 thereby closing a circuit from battery by way of cam C contacts, conductor 147, closed contact 203, conductor 169, detonator 26, contact 128, contact element 126 and thence to ground thereby causing the detonator to operate and explode the mine.

In the event that the signals received by the amplifier during the movement of the cam assembly of the timing device TD for one revolution are not sufficient in strength to cause the operation of the piezoelectric relay PR', the mine is not exploded and the operation of the timing device continues until the cams thereof are moved into the normal or home postion at the completion of one revolution thereof.

It is to be noted that, as the cam assembly TD approaches one revolution, cam D is the first to disengage its contacts thereby removing the short circuit from resistance 154 which is of sufficiently high order of magnitude to prevent the operation of piezoelectric relay PR' as the filament circuit to the amplifier is interrupted at cam C contacts during the movement of cam C into its open position for succeeding impulses. As the cam assembly is advanced in resopnse to succeeding impulses, the notch of cam B closes its contacts thereby applying ground at conductor 131, by way of contacts 97 and 100 of the acoustic detector, conductor 138, cam B contacts, conductor 137 and resistance 132 to the grid of the tube 133 thereby decreasing the voltage of the grid to a value below the firing potential and effectively preventing additional firing of the tube and further operation of the timing device at this time.

The resistance 158 is provided in parallel with the piezoelectric relay PR' to insure that the voltage drop across the relay as the tube 151 fires is insufficient to cause the plate voltage of the tube to be decreased to such a value that the arc between the filament and the plate of the tube is extinguished. The firing voltage applied to the grid of the tube 151 is of relatively short duration and the continuance of the arc within the tube depends upon the maintenance of a sustained voltage of predetermined minimum value on the plate of the tube. The use of the resistance 158 in the manner disclosed provides a low impedance path in the plate circuit of the tube in parallel with the piezoelectric relay PR' whereby the plate voltage is maintained at a predetermined value after the firing potential has been removed from the grid.

Briefly stated in summary, the present invention contemplates the provision of a mine firing mechanism in which the mine is caused to assume an armed condition in response to waves or impulses of hydrostatic pressure received from the propeller of an approaching vessel and in which the firing of the mine is controlled by the gradient of the magnetic field detected by field sensing mechanism and in which the explosion of the mine is delayed until the vessel is directly above the mine. Furthermore, the system of the present invention utilizes piezoelectric relay means in lieu of electromagnetic relay means whereby the attendant large magnetic field disturbance and current drain which are inevitable upon actuation of an electromagnetic type relay are obviated.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In a submarine mine, the combination of magnetic field gradient sensing means, an explosive charge, a firing circuit for said charge having an input circuit and adapted to operate upon application of gradient signals of predetermined magnitude applied thereto, contacts for connection of said sensing means to said input circuit, a piezoelectric relay actuable when energized to close said contacts and effect said connection, and a relaxation oscillator adapted to periodically energize said relay whereby gradient signals from said sensing means are periodically applied to said input circuit.

2. In a magnetic detecting apparatus, the combination of a spaced pair of opposedly connected pick-up coils for generating signals proportional to the time rate of change in the magnetic gradient therebetween, a transformer having a primary winding and a secondary winding, a signal circuit connected to said secondary winding, normally open contacting means adaptable when closed to connect said coils to said primary winding whereby said signals are transferred thereby to said signal circuit, piezoelectric means actuable when energized to close said contacting means, relaxation oscillator for energizing said piezoelectric means periodically, and an electroresponsive utilization device operably connected to the output of said signal circuit, said signal circuit being effective to operate said device when said signals have increased to a predetermined value.

3. The combination according to claim 2 in which said utilization device is a piezoelectric relay having contacts adaptable to be closed upon operation of the relay.

4. The combination according to claim 3 and including a source of power and an electroresponsive detonator operably connected to be energized from said source upon closure of the contacts of said piezoelectric relay.

5. In a magnetic detecting apparatus, the combination of a spaced pair of opposedly connected pick-up coils, circuit means including said coils and a pair of contacts for periodically sampling the difference in time rate of change of magnetic field at said coils and producing a signal in accordance therewith, a piezoelectric actuator for said contacts, means for energizing said actuator at the period of said sampling, and utilization means for said signal.

6. In a submarine mine, the combination of a pair of spaced magnetic pick-up coils, a capacitor, a series circuit including said capacitor and coils, said coils being connected in series opposition, a transformer having a primary and secondary winding, a pair of normally open contacts, a circuit connecting said primary and said contacts serially across said capacitor, an electroresponsive detonator, a firing circuit for said detonator including an amplifier and having an input circuit, operable connections between said secondary and said input circuit, a piezoelectric actuator for closing said contacts, and means for periodically energizing said actuator whereby signals corresponding to the difference in time rate of change of magnetic field between said coils are supplied to said amplifier in a form suitable for amplification thereby, said firing circuit being effective to energize said detonator in response to amplified signals of predetermined value.

7. The combination according to claim 6 in which the means for periodically energizing said actuator includes a relaxation oscillator.

8. The combination according to claim 7 in which said firing circuit includes a piezoelectric relay for closing a circuit to energize said detonator.

References Cited in the file of this patent

UNITED STATES PATENTS

| | | |
|---|---|---|
| 2,297,543 | Eberhardt et al. | Sept. 29, 1942 |
| 2,517,975 | Chapin | Aug. 8, 1950 |